UNITED STATES PATENT OFFICE.

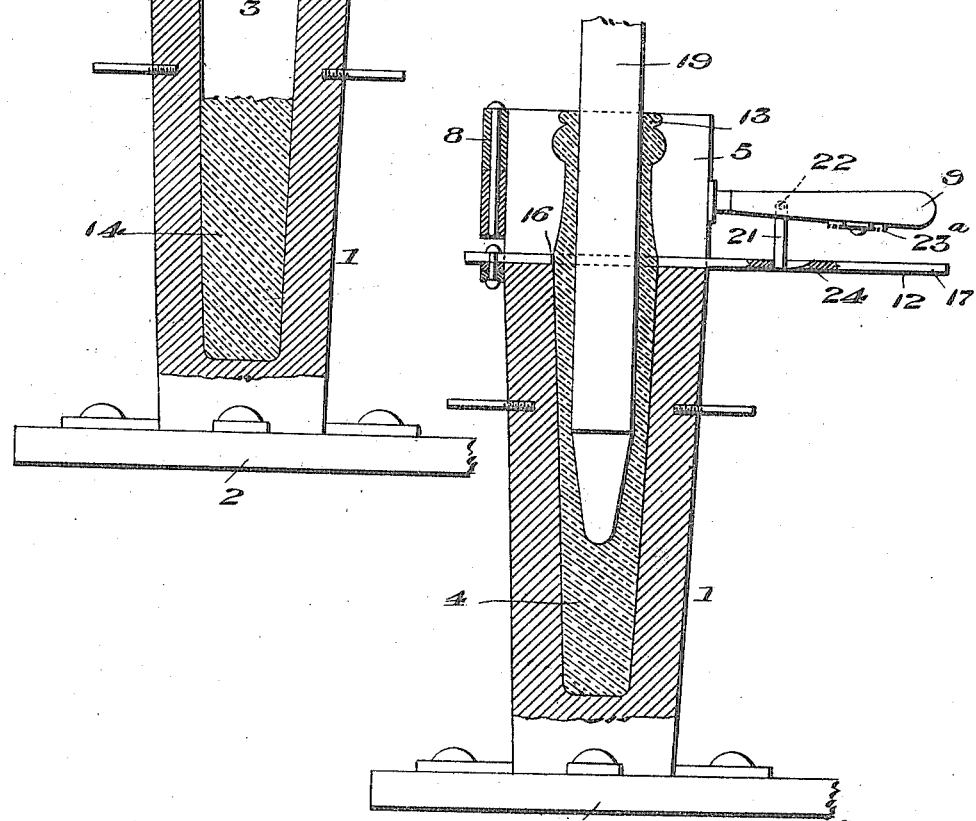

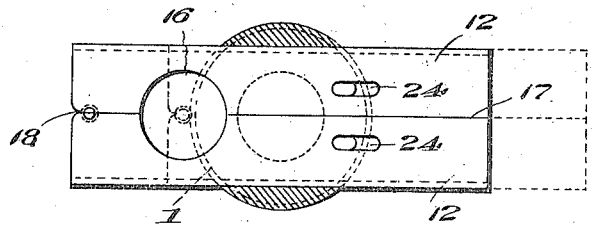
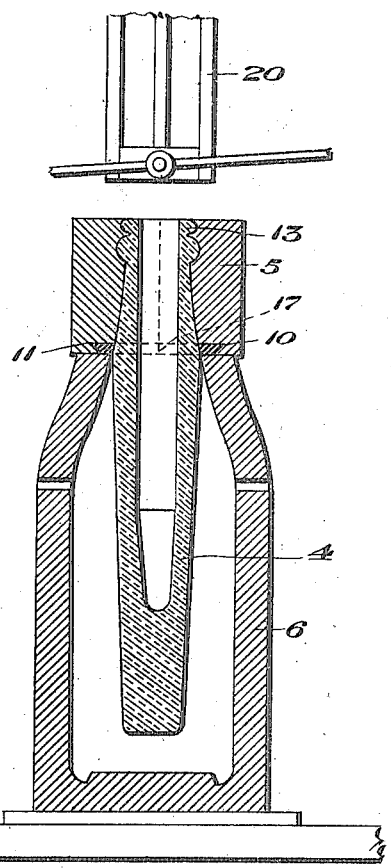
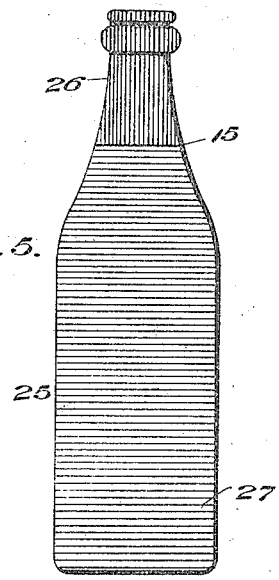

CHARLES K. FINKBEINER, OF LAURENS, SOUTH CAROLINA, ASSIGNOR, BY DIRECT AND MESNE ASSIGNMENTS, TO PARTI-COLORED GLASS BOTTLE COMPANY, OF WASHINGTON, DISTRICT OF COLUMBIA, A CORPORATION OF DELAWARE.

APPARATUS FOR MANUFACTURING GLASS BOTTLES AND SIMILAR ARTICLES.

1,266,786.     Specification of Letters Patent.     Patented May 21, 1918.

Application filed April 19, 1916. Serial No. 92,179.

*To all whom it may concern:*

Be it known that I, CHARLES K. FINKBEINER, a citizen of the United States, residing at Laurens, in the county of Laurens and State of South Carolina, have invented certain new and useful Improvements in Apparatus for Manufacturing Glass Bottles and Similar Articles, (Case B;) and I do hereby declare the following to be a full, clear, and exact description of the invention, such as will enable others skilled in the art to which it appertains to make and use the same.

My invention relates to improvements in apparatus for manufacturing bottles and analogous receptacles.

The object of the present invention is to improve the construction of apparatus for the manufacture of bottles and analogous receptacles and to provide a simple, practical and efficient apparatus adapted to produce a single piece or integral receptacle having distinctive portions such as a distinctive neck of colored or tinted glass of a different appearance from the body of the bottle or the receptacle, to indicate the origin or kind of bottle or the contents thereof and thereby obviate the necessity of applying tinfoil sealing caps and similar sealing devices for such purpose.

A further object of the invention is to provide an apparatus of this character capable of enabling such bottles or analogous receptacles to be rapidly manufactured at an exceedingly low cost of production so that such bottles may be substituted for ordinary beer bottles and other bottles containing beverages of an alcoholic or non-alcoholic character.

A further object of the invention is to provide an apparatus adapted to produce bottles and analogous receptacles having integral portions constructed of distinctive kinds of glass of a uniform character without any irregularity at the point where the two kinds of glass unite.

With these and other objects in view the invention consists in the construction and novel combination and arrangement of parts hereinafter fully described, illustrated in the accompanying drawings and pointed out in the claims hereunto appended, it being understood that various changes in the form, proportion and minor details of construction may be resorted to without departing from the spirit or sacrificing any of the advantages of the invention.

In the drawings:—

Figure 1 is a vertical sectional view of a blank mold and a neck mold embodying the invention, the plunger being moved downwardly a sufficient distance to mold the neck portion of the receptacle.

Fig. 2 is a similar view, the plunger being moved downwardly to the limit of its downward movement to complete the blank.

Fig. 3 is a horizontal sectional view on the line 3—3 of Fig. 1.

Fig. 4 is a vertical sectional view through a blow mold with the blank therein.

Fig. 5 is an elevation of the bottle.

Like numerals of reference designate corresponding parts in all the figures of the drawings.

Referring to the drawings, 1 designates a blank mold of any desired construction bolted or otherwise secured upon a table 2, and preferably provided with a downwardly tapered cylindrical interior mold cavity to enable the completed blank 4 to be readily lifted out of the blank mold by a neck mold 5, in order to transfer the said blank 4 from the blank mold to a blow mold 6. The neck mold 5 which is composed of two hinged sections connected at the back by a suitable hinge 8, and provided with handles 9 at the front, may be of any desired construction and interior configuration, to mold a neck of the desired form. The neck mold, which is adapted to be attached first to the blank mold and afterward to the blow mold is provided with a dove-tailed groove or way 10 having inclined side walls adapted to receive the beveled side edges 11 of a gate 12, adapted to close the bottom of the neck mold for confining therein a quantity of glass 13 of a different kind as to shade or color from a quantity of glass 14 contained in the blank mold, whereby the neck portion of the bottle, or other receptacle, may be molded with a uniform margin 15. The gate 12, which is constructed of sheet metal or other suitable material, is slidable through the dove-tail way 10, and it is adapted to project in advance and in rear of the neck mold, and it is provided with an aperture 16 of a diameter corresponding with the mouth or entrance of the blank mold and adapted to be brought into register with the same to permit the plunger to descend into the blank mold. The gate 12 is preferably constructed of two longitudinal sections having meeting inner edges 17 and connected at the back by a hinge 18, which is adapted to form a stop for engaging the blank mold to limit the forward or outward movement of the gate 12, when the opening 16 is in register with the mouth or entrance of the blank mold. The movement of the slide may be effected either by hand or mechanically.

The glass 14, which forms the body portion of the bottle, is placed in the mold prior to the placing of the neck mold upon the blank mold 1. After the glass 14 is placed in the blank mold, the neck mold is placed thereon with an imperforate portion of the slide or gate 12 covering the mouth of the blank mold, thus confining the glass 13 in the neck mold. The glass 13 is then placed in the neck mold and the plunger 19 is moved downwardly to the position illustrated in Fig. 1 of the drawings to mold the neck portion of the bottle. The gate is then pulled outward to bring the opening 16 over the mouth of the blank mold, and the plunger is then moved downwardly to the limit of its downward movement to complete the molding of the bottle blank. The plunger forces the glass 14 upwardly and outwardly and causes the same to unite under pressure with the glass 13 constituting the neck portion of the bottle.

The blank, after being completed in the manner illustrated in Fig. 2 of the drawing, is transferred to the blow mold 6, and the molding of the bottle is completed by bringing the blow head 20 down upon the neck mold in the usual manner.

The blow mold 6 is of the usual construction, being composed of two hinged sections which are adapted to be opened to permit the removal of the bottle, which when removed from the blow mold is treated in the usual manner in a leer or annealing oven.

The sections of the gate 12 are adapted to be opened simultaneously with the sections of the neck mold, and the handles 9 are provided with pivoted arms 21 secured by a pivot 22 in a recess 23 in the lower side of each of the handles 9. These pivoted arms are adapted to drop by gravity into notches or openings 24 formed in the sections of the slide or closure 12 as clearly illustrated in Fig. 2 of the drawings. The pivoted arms are adapted to be retained in an elevated position within the recesses 23 by pivoted catches or buttons 23ª located at the lower faces of the handles. The pivoted arms 21 are adapted to interlock the sections of the slide or closure 12 with the handles of the sections of the neck mold so that when the latter is opened the sections of the gate 12 will also be opened for removal from the neck of the bottle or other receptacle.

The completed bottle 25 illustrated in Fig. 5 of the drawing is shown with its neck portion 26 of red glass and its bottom portion 27 of blue glass for convenience of illustration. Any other distinguishing kind of glass may be employed, as for instance the body portion of the bottle may be of ordinary flint glass and the neck portion of tinted glass. Also while the slidable closure is shown applied to the neck mold at the bottom thereof for making the neck portion of the bottle distinctive from the rest of the same, the closure may be located at any other desired point so as to make the neck portion of greater or less length.

The gate may, for instance, be fitted into the top of the body mold, in which case it need not be made in two parts, because, since the opening therein would be of the same diameter as the opening in the body mold, the blank might be withdrawn through it.

It will be noted that the pressure of the plunger upon and into the hot and almost liquid glass in the blank mold will insure a strong welding union between the two masses of glass. The strength and finish of this joint is further improved by the subsequent operation of blowing, and the final operation of annealing removes any strains.

It will be seen that the apparatus is adapted to rapidly manufacture bottles and analogous receptacles having integral portions of a distinctive character, and that bottles and receptacles having such distinctive portions may be advantageously employed for designating various brands, or the origin of the contents of the receptacle.

Furthermore, it will be clear that the apparatus is adapted to constitute a portion of various types of bottle making machines, and that the blank may be formed by using the blank mold in either an upright or inverted position.

I claim as my invention.

1. In a bottle making machine, in combination, a blank mold, a separable neck mold, ways therein and a slide movable in said ways, said slide being provided with an opening as large as the opening into the blank mold.

2. In a bottle making machine, in combination, a blank mold, a neck mold, slide ways arranged between the two molds and a slide arranged to slide in said ways, said slide being provided with an opening at least as large as the channel between the neck and blank molds.

3. In a bottle making machine, in combination, a blank mold, a neck mold, ways between said neck mold and said blank mold and a slide arranged in said ways, said slide being provided with an opening as large as the channel between said ways and adapted to form a part of said channel in one position of the slide, and also with a solid part adapted to close said channel in another position of said slide.

4. In a bottle making machine, in combination, a blank mold, a neck mold therefor, ways in said neck mold, and a slide in said ways, said slide being provided in one end with an opening the size of the channel between the neck mold and the blank mold, and being at the other end continuous so as to afford a closure for said channel when the slide is in a proper position.

5. In a bottle making machine, in combination, a blank mold, a neck mold therefor, ways in said neck mold and a sectional slide in said ways, said slide being provided at one end with an opening the size of the channel between the neck mold and the blank mold, the slide being partible across said opening.

6. In a bottle making machine, in combination, a blank mold, a neck mold therefor, ways in said neck mold and a sectional slide in said ways, said slide being provided at one end with an opening the size of the channel between the neck mold and the blank mold, the slide being partible lengthwise across said opening.

7. In a bottle making machine, in combination, a blank mold, a neck mold therefor, ways in said neck mold and a sectional slide in said ways, said slide being provided at one end with an opening the size of the channel between the neck mold and the blank mold, the slide being partible across said opening, and means for holding together said sections.

8. In a bottle making machine, in combination, a blank mold, a hinged neck mold therefor, ways in said neck mold, and a sectional slide in said ways, the sections of said slide being hinged to move with the hinged sections of the neck mold.

9. A machine for making glass bottles and analogous receptacles, including a blank mold, a neck mold arranged on the blank mold, and a slidable closure adapted to divide the space within the said molds into two separate compartments to enable two different kinds of glass to be successively operated on, and a plunger adapted to be operated to first mold the neck or ring portion of the receptacle, and then operate on the rest of the glass to cause the same to unite with the said neck or ring portion to form a complete blank.

10. A machine for making glass bottles and analogous receptacles including a blank mold, a neck mold arranged on the blank mold, and a slidable closure carried by the neck mold and adapted to permit two different kinds of glass to be successively operated on, and a plunger, said plunger adapted to first form the neck or ring portion of the receptacle and then complete the formation of the blank and unite the two different kinds of glass.

11. A machine for making glass bottles and analogous receptacles including a blank mold, a neck mold, and a slidable closure arranged to permit two different kinds of glass to be successively operated on, and a plunger, said closure being provided with an opening for the passage of the plunger.

12. A machine for making glass bottles and analogous receptacles including a blank mold, a neck mold arranged on the blank mold and provided with a guide or way, and a slidable closure mounted in the guideway and provided with an opening, and a plunger, said plunger being adapted to pass through said opening.

13. A machine for making glass bottles and analogous receptacles including a blank mold, a neck mold composed of hinged sections, a slidable closure carried by the neck mold and composed of hinged sections arranged to be opened and closed with the sections of the neck mold, and ways in the joint between said blank and neck molds in which said closure may slide, said closure being imperforate at one end and at the other end having an opening registering with the openings between the neck and blank molds.

14. A machine for making glass bottles and analogous receptacles including a blank mold and a neck mold composed of hinged sections provided with handles, a slidable closure carried by the neck mold and composed of hinged sections, and means for connecting the sections of the closure with the sections of the neck mold for causing the said sections to open and close simultaneously, the slidable closure being adapted when in one position to close the opening between the neck and blank molds.

15. A machine for making glass bottles and analogous receptacles including a blank mold and a neck mold composed of hinged sections provided with handles, a slidable closure carried by the neck mold and composed of hinged sections, and movable locking devices carried by the sections of the neck mold and arranged to engage the sections of the slidable closure, the slidable closure being adapted when in one position to close the opening between the neck and blank molds.

16. A machine for making glass bottles and analogous receptacles including a blank mold and a neck mold composed of hinged sections provided with handles, a slidable closure carried by the neck mold composed of hinged sections provided with openings, and pivoted arms mounted on the handles and arranged to engage said openings, the slidable closure being adapted when in one position to close the opening between the neck and blank molds.

17. A machine for making glass bottles and analogous receptacles including a blank mold and a neck mold composed of hinged sections provided with handles, a slidable closure imperforate at one end and provided with an opening at the other, carried by the neck mold, and composed of hinged sections provided with openings, and pivoted arms mounted on the handles and arranged to engage the said recesses or openings, and catches mounted on the handles, for retaining the arms in an elevated position, out of engagement with the sections of the slidable closure.

In testimony whereof, I affix my signature.

CHAS. K. FINKBEINER.

Copies of this patent may be obtained for five cents each, by addressing the "Commissioner of Patents, Washington, D. C."